United States Patent [19]

Ide et al.

[11] Patent Number: 4,772,089
[45] Date of Patent: Sep. 20, 1988

[54] OPTICAL FIBER CABLE AND METHOD FOR PRODUCING SAME

[75] Inventors: Yoshiaki Ide, N. Plainfield; Gabor Kiss, Summit; Hyun N. Yoon, Morristown, all of N.J.

[73] Assignee: Polyplastics Co., Ltd., Osaka, Japan

[21] Appl. No.: 738,233

[22] Filed: May 28, 1985

Related U.S. Application Data

[63] Continuation of Ser. No. 364,823, Apr. 2, 1982, abandoned.

[51] Int. Cl.$^4$ ................................................ G02B 6/44
[52] U.S. Cl. ................................ 350/96.23; 350/96.34
[58] Field of Search .............. 350/96.23, 96.29, 96.34

[56] References Cited

U.S. PATENT DOCUMENTS

| 3,865,466 | 2/1975 | Slaughter . | |
|---|---|---|---|
| 3,991,013 | 11/1976 | Pletcher | 260/47 C |
| 4,037,922 | 7/1977 | Claypoole . | |
| 4,093,342 | 6/1978 | Foord et al. | 350/96.23 |
| 4,110,001 | 8/1978 | Olszewski et al. . | |
| 4,153,779 | 5/1979 | Jackson, Jr. et al. | 528/176 |
| 4,184,996 | 1/1980 | Calundann | 260/40 R |
| 4,226,504 | 10/1980 | Bellino . | |
| 4,361,381 | 11/1982 | Williams | 350/96.23 |
| 4,379,614 | 4/1983 | Liertz | 350/96.23 |

FOREIGN PATENT DOCUMENTS

| 2928678 | 1/1981 | Fed. Rep. of Germany . |
|---|---|---|
| 1409303 | 10/1975 | United Kingdom . |
| 2001182A | 1/1979 | United Kingdom . |
| 1601005 | 10/1981 | United Kingdom . |

Primary Examiner—William L. Sikes
Assistant Examiner—Robert E. Wise
Attorney, Agent, or Firm—Burns, Doane, Swecker & Mathis

[57] ABSTRACT

A fiber-optic cable has reinforcement in the form of an elongated member such as a hollow tube, a member of solid circular cross-section, a channel member and/or an outer jacket formed of a thermotropic liquid crystalline polymer. That polymer has a coefficient of linear thermal expansion in the range of from $-10 \times 10^{-6}/°F$. to $-4 \times 10^{-6}/°F$. The reinforcing members constitute strength members which are preferably formed separate from, or simultaneously with, the introduction of an optical fiber.

48 Claims, 2 Drawing Sheets

OPTICAL FIBER CABLE AND METHOD FOR PRODUCING SAME

This application is a continuation of application Ser. No. 364,823 filed Apr. 2, 1982 now abandoned.

CROSS-REFERENCE TO RELATED APPLICATION

In our copending U.S. Ser. No. 364,824 filed concurrently herewith, entitled "Melt Extruded Elongated Member Suitable for Improved Service as a Stiffening Support in an Optical Fiber Cable" is claimed a melt extruded elongated member which is suitable for use in the optical fiber cable of the present invention. The disclosure of this companion application is incorporated herein by reference in its entirety.

BACKGROUND AND OBJECTS OF THE INVENTION

The present invention relates to fiber-optic cable and, in particular, to the reinforcement of such cable.

Fiber-optic cable is rapidly gaining in preference over metallic wire electric cables for a variety of reasons, especially the wide band width and low attenuation which are characteristic of optical fibers. Optical fibers, however, are generally very thin and unable to withstand appreciable mechanical loading, and thus do not aid in strengthening the cable as do the metallic wires of electric wire cables. As a result, special measures must be taken to reinforce fiber-optic cable because the transmission capability of optical fibers deteriorates as the fibers are subjected to strain. Below a certain level of strain, the deterioration is reversible and is thus permissible during cable installation, but not during cable operation. Above that level of strain, however, the deterioration is permanent and is thus not permissible at any stage of handling or operation. Thus, it is critical that stresses incurred during handling and operation be prevented from excessively straining the optical fiber.

The provision of strength members in the cable represents one possible means of reinforcing the cable. The use of metal reinforcement has been proposed in U.S. Pat. No. 3,865,466 to Slaughter and U.S. Pat. No. 4,110,001 to Olszewski et al. Other materials, such as nylon, polyester, lyotropic liquid crystalline polymer (e.g., Kevlar poly (p-phenylene terephthalamide)), polyethylene, polyethylene terephthalate, cotton, E and S glass/epoxy rods, etc., have also been proposed, e.g., see U.S. Pat. No. 4,037,922 to Claypoole, U.S. Pat. No. 4,093,342 to Foord et al, and U.S. Pat. No. 4,226,504 to Bellino.

However, the use of metal strengtheners is not compatible with all applications of fiber-optic cable, some of which may specify that the cable be free of electrically conductive components. Conversely, in some applications metallic elements may be tolerable, but may be advantageously eliminated from the point of view of reducing cable weight or increasing the useful temperature range of the cable.

The use of poly (p-phenylene terephthalamide) as the reinforcement has first necessitated the dissolution of the polymer in an appropriate solvent for the same, and the solution spinning of a large number of relatively fine denier fibers (e.g., thousands of filaments) which may optionally be embedded in an appropriate resin (e.g., an epoxy resin) to form the stiffening member. Such poly(p-phenylene terephthalamide) is incapable of melt extrusion and the procedures required to form the reinforcing member are time consuming, and involve considerable expense. Also, the resulting stiffening member because of the fabrication techniques inherently required is only with difficulty amenable to formation into complex cross-sectional configurations.

Reinforcig members available in the prior art which are composed of E and S glass/epoxy rods are commonly formed by pultrusion and have been found to present shortcomings during service within the resulting cable assembly. For instance, such rods may be susceptible to undesirable thermal expansion and contraction and have tended to be unduly inflexible and relatively brittle which may result in cable failure if the cable assembly is sharply bent.

Some reinforcement arrangements while generally serving to prevent excessive deformation of the optical fiber may, under certain conditions, such as temperature change for example, actually contribute to such excessive deformations. That is, the particular linear thermal expansion characteristics of the reinforcement may render the overall coefficient of linear thermal expansion of the cable significantly different from that of the optical fiber. As a result, the optical fiber may be subject to excessive deformation under extreme temperature conditions.

Figure 1:
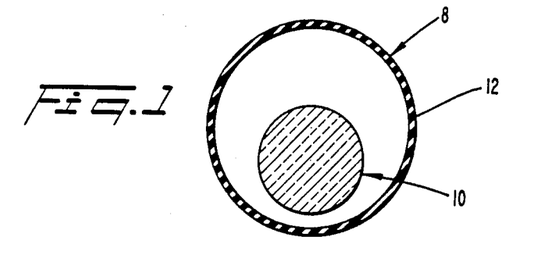
FIG. 1 is a cross-sectional view of a fiber-optic cable unit in which an optical fiber is disposed within a tube.
Figures 2, 3, 4:
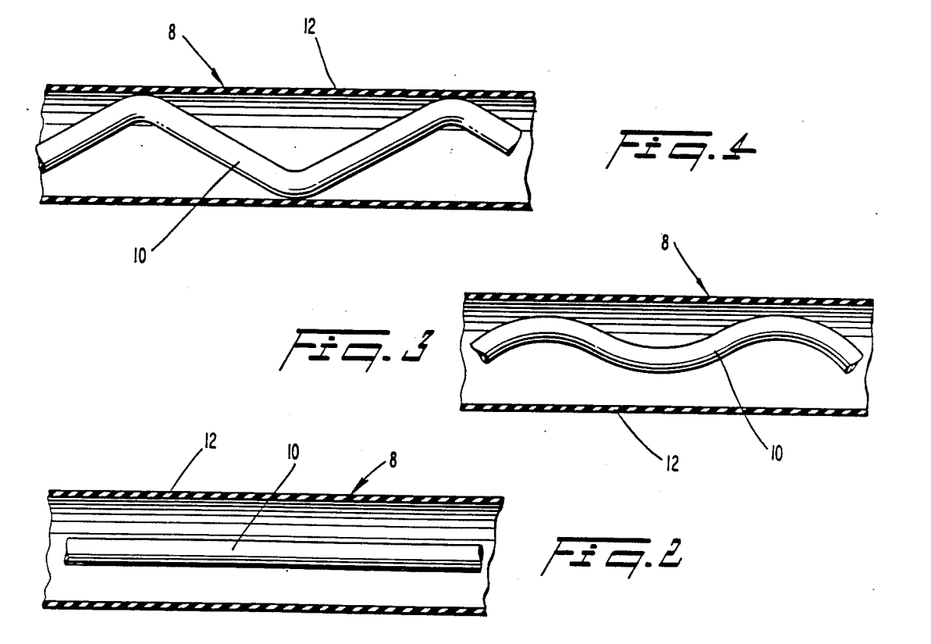
FIG. 2 is a schematic longitudinal sectional view through the unit depicted in FIG. 1.
FIG. 3 is a view similar to FIG. 2 depicting one technique for resisting thermally-induced straining of the optical fiber.
FIG. 4 is a view of the unit depicted in FIG. 3 in response to the unit being subjected to cold temperatures.

For example, attention is directed to FIGS. 1 and 2 which depict a fiber-optic cable unit 8 wherein an optical fiber 10 is encased within a buffer tube 12 formed of a thermoplastic material. The inner diameter of the tube may be of greater diameter than the outer diameter of the fiber, the space therebetween filled with a water-repelling medium. Additional reinforcement (not shown) would typically be provided e.g., a central high-strength elongated number around which the optical fiber is helically wound, or high-strength wires helically wound around the tube 12), since a conventional thermoplastic tube is too weak to constitute a strength member. This can be expected to result in a condition where the net linear thermal expansion coefficient of the overall cable varies considerably from that of the optical fiber itself. Accordingly, as the temperature increases, the cable tends to expand to a greater extent than the optical fiber, whereby the fiber is strained. One manner of minimizing this problem is to preslacken the fiber, as depicted in FIG. 3, whereby the overall cable can expand to a greater extent than the optical fiber itself, without straining the fiber (i.e., the slack is "taken-up" during cable expansion).

However, the amount of pre-slack which can be "built-into" the cable is limited, due to the fact that during colder temperatures the overall cable contracts to a greater extent than the optical fiber due to the significant difference in the coefficient of linear thermal expansion. Thus, as the temperature decreases, the amount of slack increases due to the lesser extent of contraction of the optical fiber. If this results in the fiber bearing against the wall of the tube (FIG. 4), the "microbending losses" in the fiber are significantly increased, thereby increasing attenuation losses of the fiber.

Therefore, it will be appreciated that a mismatch between the linear thermal expansion coefficient of the optical fiber and the net linear thermal expansion coefficient of the overall cable places limits on the upper and lower temperatures in which the cable may be effectively utilized; the greater the mismatch, the smaller the range of effective utilization.

Another problem occurring in connection with fiber-optic cable relates to the difficulty in repairing a broken cable. When a break occurs, it is presently necessary to locate and identify the damaged optical fiber(s) in order to perform a splicing operation. This procedure is difficult enough due to the small size of the fiber, but is made even more difficult in conventional cables which are cluttered with numerous reinforcing strands. Although it has been previously proposed to position each fiber within its own individual tube, e.g., an extruded polyethylene terephthalate tube, in order to facilitate fiber identification, such an arrangement would add to the size, weight, and internal clutter of the cable.

A further problem relates to the fact that conventional techniques for reinforcing the cable must be adapted to the particular type of cable being produced, i.e., the cable must be redesigned for the particular end uses. One reason for this relatively expensive requirement is that in conventional cables the reinforcement is common to all of the optical fibers. In an effort to deal with this problem, it has been proposed to individually encase each fiber (see U.S. Pat. No. 4,188,088 issued to Andersen et al on Feb. 12, 1980). This is achieved by encasing each fiber within a dumbbell-shaped sheath of flexible polymer material. A separate strengthener strand is embedded within another portion of the sheath. This arrangement, however, does not minimize the bulk and weight problems, nor the thermall-induced strain problems discussed earlier.

It is, therefore, an object of the present invention to minimize or obviate problems of the type discussed above.

A further object of the invention is to minimize the size, weight, and bulk of a fiber-optic cable while maintaining ample strength of the cable.

Another object is to increase the temperature range in which fiber-optic cable may be effectively utilized.

An additional object of the invention is to provide a reinforced fiber-optic cable in which the coefficient of linear expansion of the overall cable closely approximates that of the optical fiber.

A further object of the invention is to facilitate the splicing of fiber-optic cables.

Yet another object of the invention is to provide a cable having multiple optical fibers in which the individual fibers can be easily found and identified.

An additional object of the invention is to enable a given component of fiber-optic cable to perform a multiplicity of functions.

A further object of the invention is to facilitate the manufacture of stength members for use in fiber-optic cable.

SUMMARY OF THE INVENTION

These objects are achieved in accordance with the present invention which relates to fiber-optic cable and methods for producing same.

In accordance with one aspect of the present invention, a reinforced fiber-optic cable comprises at least one optical fiber, and at least one strength member comprising a hollow tube formed-in-place around the at least one optical fiber. The tube is formed of a thermotropic liquid crystalline polymer which resists deformation and breakage of the at least one optical fiber.

The at least one optical fiber may comprise a single fiber, and the at least one strength member may comprise a single tube surrounding the fiber.

The at least one optical fiber may comprise a plurality of fibers, and the at least one stiffening member may comprise a plurality of tubes individually surrounding the fibers, with a jacket surrounding all of the tubes. The jacket may comprise a thermotropic liquid crystalline polymer.

In another aspect of the present invention, a reinforced optic-fiber cable may comprise a strength member in the form of a channel member which includes a core and a plurality of longitudinal channels. The channel member is formed of a thermotropic liquid crystalline polymer which resists deformation of the cable. A plurality of optical fibers would be disposed in respective ones of the channels.

Preferably, the channel member includes a plurality of ribs projecting radially from the core to define the channels.

Preferably, the channels are outwardly open, and a jacket surrounds the channel member and encloses the channels. The jacket may be formed of a thermotropic liquid crystalline polymer.

The optical fiber may be formed of glass, with the thermotropic liquid crystalline polymer having a coefficient of linear thermal expansion of from $-10 \times 10^{-6}/°F$. to $-4 \times 10^{6-}/°F$.

In another aspect of the present invention, a reinforced fiber-optic cable comprises at least one optical fiber and at least one strength member comprising an elongated member formed of thermotropic liquid crystalline polymer extending generally in the direction of the fiber. A jacket encloses the fiber and the elongated member. The jacket may be formed of a thermotropic liquid crystalline polymer.

Preferably, the elongated member is helically wound around the fiber or extends parallel thereto.

There may be provided a plurality of fibers, with the elongated member disposed centrally of the fibers.

In another aspect of the present invention, a reinforced fiber-optic cable comprises a plurality of optical fibers and a strength member extending along the fibers. A jacket formed of a thermotropic liquid crystalline polymer surrounds the fibers and strength member.

The fibers may be arranged in spaced rows, with a layer of thermotropic liquid crystalline polymer separating adjacent rows.

The present invention includes methods of making reinforced fiber-optic cable. One method aspect comprises the steps of forming a strength member by extruding a thermotropic liquid crystalline polymer in the shape of a hollow tube surrounding an optical fiber such that deformation and breakage of the fiber is resisted by the tube. The tube may be formed, for example, by extrusion or by coating the optical fiber with thermotropic liquid crystalline polymer.

Another method aspect of the invention comprises the steps of forming a strength member by extruding a thermotropic liquid crystalline polymer in the shape of a channel member having a core and a plurality of longitudinal channels. Optical fibers are positioned within respective ones of the channels, with deformation and breakage of the fibers being resisted by the strength member.

A further method aspect of the invention involves the steps of forming a strength member by extruding a thermotropic liquid crystalline polymer in the shape of an elongated member. The elongated member is positioned adjacent an optical fiber and extends generally in the longitudinal direction thereof. A jacket is disposed in surrounding relationship to the optical fiber and strand. The jacket may be formed of a thermotropic liquid crystalline polymer.

The thermotropic liquid crystalline polymer contains unique characteristics in the area of tensile modulus, coefficient of linear thermal expansion, and ease of manufacture which render it ideally suited to the manufacture of fiber-optic cable and enable a single component to perform multiple functions whereby the size, weight, and bulk of the cable can be greatly enhanced. In cases where the optical fiber is formed of glass, and wherein the thermotropic liquid crystalline polymer has a coefficient of linear thermal expansion of from $-10 \times 10^{-6}/°F$. to $-4 \times 10^{-6}/°F$., the temperature range in which the fiber-optic cable xay be effectively utilized, is significantly increased.

THE DRAWINGS

The objects and advantages of the invention will become apparent from the following detailed description of preferred embodiments thereof, in connection with the accompanying drawings in which like numerals designate like elements, and in which.

DETAILED DESCRIPTION OF THE INVENTION

In accordance with the present invention, it has been found that thermotropic liquid crystal polymers are uniquely suited to form improved reinforcement for fiber-optic cables.

The thermotropic liquid crystalline polymer from which the elongated members of the present invention is formed is of the requisite molecular weight to be capable of undergoing melt extrusion. Such thermotropic liquid crystalline polymers have been known in the art but have not prior to the invention been recognized to be suitable for forming the presently claimed elongated article which has been found to be capable of improved service as a stiffening support in an optical fiber cable.

As is known in polymer technology a thermotropic liquid crystalline polymer exhibits optical anisotropy in the melt. The anisotropic character of the polymer melt may be confirmed by conventional polarized light techniques whereby crossed-polarizers are utilized. More specifically, the anisotropic nature of the melt phase may conveniently be confirmed by the use of a Leitz polarizing microscope at a magnification of 40× with the sample on a Leitz hot stage and under a nitrogen atmosphere. The amount of light transmitted changes when the sample is forced to flow; however, the sample is optically anisotropic even in the static state. On the contrary, typical melt processable polymers do not transmit light to any substantial degree when examined under identical conditions.

Representative classes of polymers from which the thermotropic liquid crystalline polymer suitable for use in the present invention may be selected include wholly aromatic polyester, aromatic-aliphatic polyesters, wholly aromatic poly (ester-amides), aromatic-aliphatic poly(ester-amides), aromatic polyazomethines, aromatic polyester-carbonates, and mixtures of the same. In preferred embodiments the thermotropic liquid crystalline polymer is a wholly aromatic polyester, a wholly aromatic poly(ester-amide), or an aromatic-aliphatic poly(esteramide). In such wholly aromatic polyester and wholly aromatic poly(ester-amide) each moiety present within the polymer chain contribures at least one aromatic ring. Also, it is preferred that naphthalene moieties be included in the thermotropic liquid crystalline polymer, e.g., 6-oxy-2-naphthoyl moiety, 2,6-dioxynaphthalene moiety, or 2,6-dicarboxynaphthalene moiety, in a concentration of not less than about 10 percent. The particularly preferred naphthalene moiety for inclusion in the thermotropic liquid crystalline polymer is the 6-oxy-2-naphthoyl moiety in a concentration of not less than about 10 mole percent.

Representative wholly aromatic polyesters which exhibit thermotropic liquid crystalline properties include those disclosed in the following U.S. Pat. Nos. which are herein incorporated by reference: 3,991,013; 3,991,014, 4,066,620; 4,067,852; 4,075,262; 4,083,829; 4,093,595; 4,118,372; 4,130,545; 4,146,702; 4,153,779; 4,156,070; 4,159,365; 4,161,470; 4,169 933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,242,496; 4,245,082; 4,245,084; 4,247,514; 4,256,624; 4,265,802; 4,267,304; 4,269,965; 4,279,803; 4,299,756; and 4,294,955; and in commonly assigned U.S. Ser. Nos. 91,003, filed Nov. 5, 1979 (now U.S. Pat. No. 4,337,191 ); 169,014, filed July 15, 1980 (now U.S. Pat. No. 4,337,190); 194,196, filed Oct. 6, 1980 (now U.S. Pat. No. 4,318,841), and 270,440, filed June 4, 1981 (now U.S. Pat. No. 4,335,134) which are herein incorporated by reference. As discussed hereafter the wholly aromatic polyester of U.S. Pat. No. 4,161,470 is particularly preferred for use in the present invention.

Representative aromatic-aliphatic polyesters which exhibit thermotropic liquid crystalline properties are copolymers of polyethylene terephthalate and hydroxybenzoic acid as disclosed in *Polyester X-7G-A Self Reinforced Thermoplastic,* by W. J. Jackson, Jr. H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1–4. A further disclosure of such copolymers can be found in "Liquid Crystal Polymers: I"

Preparation and Properties of p-Hydroxybenzoic Acid Copolymers, *Journal of Polymer Science, Polymer Chemistry Edition*, Vol 14, pages 2043 to 2058 (1976), by W. J. Jackson, Jr. and H. F. Kuhfuss. See also commonly assigned U.S. Ser. Nos. 194,199, filed Oct. 6, 1980 (now U.S. Pat. No. 4,318,842), and 287,345, filed July 27, 1981 (now U.S. Pat. No. 4,355,133) which are herein incorporated by reference.

Representative wholly aromatic and aromatic-aliphatic poly(ester-amides) which exhibit thermotropic liquid crystalline properties are disclosed in U.S. Pat. No. 4,272,625 and in commonly assigned U.S. Ser. Nos. 214,557, filed Dec. 9, 1980 (now U.S. Pat. No. 4,330,457); 251,625, filed Apr. 6, 1981 (now U.S. Pat. No. 4,351,917); 251,629, filed Apr. 6, 1981 (now U.S. Pat. No. 4,351,918); 251,818, filed Apr. 7, 1981 (now U.S. Pat. No. 4,351,132); 251,819, filed Apr. 7, 1981; and 270,439 filed June 4, 1981 (now U.S. Pat. No. 4,339,375) which are herein incorporated by referencee. As discussed hereafter the poly(ester-amide) of U.S. Ser. No. 214,557 (now U.S. Pat. No. 4,330,457)is particularly preferred for use in the present invention

Representative aromatic polyazomethines which exhibit a thermotropic liquid crystalline properties are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly (nitrilo-2-methyl-1,4-phenylenenitriloethylidyne-1,4-phenyleneethylidyne); poly(nitrolo-2-methyl-1,4-phenylenenitrilomethylidyne-1,4-phenylene-methylidyne); and poly(nitrilo-2-chloro-1,4-phenylenenitrilomethylidyne-1,4-phenylenemethylidyne)

Representative aromatic polyester-carbonates which exhibit thermotropic liquid crystalline properties are disclosed in U.S. Pat. Nos. 4,107,143, and 4,284,757, and in commonly assigned U.S. Ser. No. 319,024, filed Nov. 6, 1981 (now U.S. Pat. No. 4,371,660), which are herein incorporated by reference Examples of such polymers include those consisting essentially of p-oxybenzoyl units, p-dioxyphenyl units, dioxycarbonyl units, and terephthoyl units.

A thermotropic liquid crystalline polymer commonly is selected for use in the formation of the elongated member of the present invention which possesses a melting temperature within the range that is amenable to melt extrusion while employing commercially available equipment. For instance, thermotropic liquid crystalline polymers commonly are selected which exhibit a melting temperature somewhere within the range of approximately 250° to 400° C.

The thermotropic liquid crystalline polymer selected preferably also exhibits an inherent viscosity of at least 2.0 dl./g. when dissolved in a concentration of 0.1 percent by weight in pentafluorophenal at 60° C. (e.g. an inherent viscosity of approximately 2.0 to 15.0 dl./g.).

The particularly preferred wholly aromatic polyester for use in the present invention is that disclosed in U.S. Pat. No. 4,161,470 which is capable of forming an anisotropic melt phase at a temperature below approximately 350° C. This polyester consists essentially of the recurring moieties I and II wherein:

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 73 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. Such polymer preferably has an inherent viscosity of approximately 3.5 to 10 dl./g. when dissolved in a concentration of 0.1 percent by weight in pentafluorophenol at 60° C.

The particularly preferred wholly aromatic poly(esteramide) or aromatic-aliphatic poly(ester-amide) for use in the present invention is disclosed in commonly assigned U.S. Ser. No. 214,557, filed Dec. 9, 1980 (now U.S. Pat. No. 4,330,457), which is capable of forming an anisotropic melt phase at a temperature below approximately 400° C. The poly(ester-amide)s there disclosed consist essentially of recurring moieties I, II, III, and, optionally, IV wherein:

I is

II is where A is a divalent radical comprising at least one aromatic ring or a divalent trans-1,4-cyclohexylene radical;

III is —Y—Ar—Z—, where Ar is a divalent radical comprising at least one aromatic ring, Y is 0, NH, or NR, and Z is NH or NR, where R is an alkyl group of 1 to 6 carbon atoms or an aryl group; and IV is O—Ar'—O—, where Ar' is a divalent radical comprising at least one aromatic ring; wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof, and wherein said poly(ester-amide) comprises approximately 10 to 90 mole percent of moiety I, approximately 5 to 45 mole percent of moiety II, approximately 5 to 45 mole percent of moiety III, and approximately 0 to 40 mole percent of moiety IV. The preferred dicarboxy aryl moiety II is:

the preferred moiety III is:

and the preferred dioxy aryl moiety IV is:

Such polymer preferably has an inherent viscosity of approximately 2.0 to 10 dl./g. when dissolved in a concentration of 0.1 percent by weight in pentafluorophenol at 60° C.

When forming the melt extruded elongated member of the present invention conventional melt extrusion apparatus can be used wherein an extrusion die is selected having a shape which corresponds to the cross-sectional configuration of the elongated member to be formed with the exception that the orifice dimensions will be larger than the dimensions of the resulting elongated member in view of drawdown of the molten polymer which occurs immediately following extrusion. Polymers other than thermotropic liquid crystalline polymers are recognized to be incapable of melt extrusion to form articles of the cross-sectional area herein discussed wherein the profile will accurately correspond to the die shape Accordingly, the thermotropic liquid crystalline polymers do not exhibit any substantial elastic recoil upon exiting from the extrusion die as do conventional polymers which are melt extruded. Suitable extrusion apparatus are described, for example, in the "Plastics Engineering Handbook" of the Society of the Plastics Industry, Pages 156 to 203, 4th Edition, edited by Joel Frados, Van Nostrand Reinhold Company, 1976. The elongated members of the present invention optionally may be formed in accordance with the teachings of commonly assigned U.S. Ser. No. 169,013, filed July 15, 1980 (now U.S. Pat. No. 4,332,759) of Yoshiaki Ide, entitled "Process for Extruding Liquid Crystal Polymer."

The temperature and pressure conditions selected for extruding the molten thermotropic liquid crystalline polymer will be influenced by the melting temperature of the polymer and its viscosity as will be apparent to those skilled in the art. Typically extrusion temperatures approximately 0° to 30° C. above the polymer melting temperature and pressures of approximately 100 to 5,000 psi are selected. In order to induce relatively high molecular orientation coextensive with the length of the elongated member, the extrudate is drawn while in the melt phase immediately adjacent the extrusion orifice and prior to complete solidification. The extent of such drawdown is influenced by the takeup speed under which the elongated member is wound or otherwise collected on an appropriate support or collection device. The resulting draw ratio is defined as the ratio of the die cross-sectional area to that of the cross-sectional area of the fully solidified extrudate. Such draw ratios commonly range between 4 and 100, and preferably between approximately 10 and 50 while utilizing the equipment described in the Examples.

In addition to the drawdown appropriate cooling must be applied to the extrudate of thermotropic liquid crystalline polymer intermediate the extrusion orifice and the point of collection. Appropriate fluid media, e.g., a gas or a liquid, may be selected to impart the desired cooling. For instance, the extrudate may be simply contacted by a stream of air or other gas or preferably immersed in a circulating bath of water or other liquid which is maintained at an appropriate temperature to impart the cooling required for solidification.

One preferred type of fiber-optic cable in accordance with the present invention is depicted in FIGS. 1 and 2, wherein a conventional optical fiber 10 is arranged within a buffer tube 12. Thus, the arrangement of the fiber and tube in accordance with the present invention can be similar to that of the prior art. In accordance with the present invention, however, the buffer tube is formed from a thermotropic liquid crystalline polymer.

A buffer tube formed of thermotropic liquid crystalline polymer constitutes more than a mere envelope for the optical fiber. Due to its high modulus and strength in tension, this tube constitutes a strengthening member which, in many instances satisfies all of the reinforcement requirements of the fiber. In this regard, a tube of thermotropic liquid crystalline polymer material of 38 mils outer diameter and 9.5 mils thickness possesses a tensile modulus of $4.5 \times 10^6$ psi. The tensile modulus of a tube of the same diameter formed of polyethylene terephthalate is much lower by comparison. Such an extruded hollow tubular configuration cannot be formed by extrusion of poly(p-phenylene terephthalamide), an organic material commonly employed as strength material in fiber optic cable, since such material cannot be melt extruded. Such a tube could only be formed of poly(p-phenylene terephthalamide) by the use of an adhesive matrix, at much greater cost due to the technological difficulty and slow speed of the pultrusion process and slow rate of cure of the required matrix.

Figure 5:
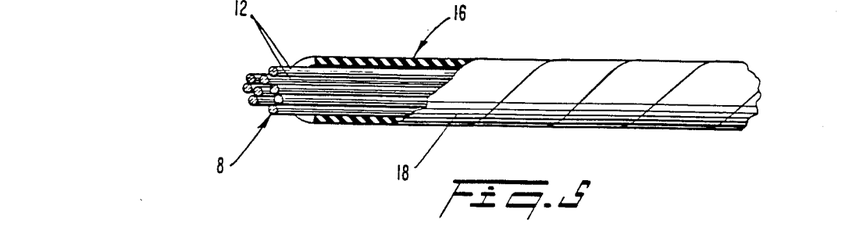
FIG. 5 is a schematic view of a plurality of cable units being bundled together.

A fiber-optic cable 16 can be fabricated by bundling together a desired plurality of the tube-and-fiber units 8. For example, the bundling can be achieved either by conventional cable jacketing techniques or by an outer jacket 18 in the form of a helical wrap of thermotropic liquid crystalline polymer (FIG. 5). In the cable 16 thus produced, the tubes 12 serve as the strength members for the individual fibers, and thus for the cable as a whole. The need for additional reinforcement may thus be eliminated or significantly minimized. In addition, the use of thermotropic liquid crystalline polymer tape as a cable wrap allows greater control of the thermal expansion of the cable, by controlling pitch, tape thickness, or the thermal expansion coefficient of the tape itself via control of molecular orientation within the tape.

Moreover, the fabrication of different cable designs is simplified since each fiber is individually reinforced rather than the fibers being commonly reinforced as a group. Thus, cables of different capacity can be provided by selecting a desired number of the individually reinforced fibers. The individual fibers are easier to isolate and identify when repair to the cable is necessary, since each fiber is contained in its own reinforcing tube and since there is no multitude of reinforcement strands or yarns which clutter the inside of the cable.

Furthermore, the use of a strength member formed of thermotropic liquid crystalline polymer enables the fiber to be used within a relatively wide temperature range. This advantage results from the fact that the thermotropic liquid crystalline polymer material possesses a negative and controllable linear thermal expansion coefficient so that the overall linear thermal expansion coefficient of the finished cable closely approximates that of glass optical fibers (i.e., the linear thermal expansion coefficient of thermotropic liquid crystalline polymer can range from approximately $-10 \times 10^{-6}/°F$. to $-4 \times 10^{-6}/°F$., as compared with a coefficient of approximately $+0.25 \times 10^{-6}/°F$. to $+1.25 \times 10^{-6}/°F$. for commercially available glass optical fibers. Accordingly, the expansion (or contraction) of the thermotropic liquid crystalline polymer counteracts the expansion (or contraction) of the other elements and structures within the cable composed of conventional materials, so that the expansion and contraction of the overall cable and fiber are so close that excessive straining of the fibers is avoided over a much wider range of temperatures than has heretofore been possible.

The coefficient of linear thermal expansion can be conveniently determined with a DuPont thermomechanical analyzer while examining the elongated member at temperatures below 100° C.

The tube 12 is formed-in-place around the optical fibers 10 by means of, for example, an extrusion or pultrusion process, or coating the optical fiber with the thermotropic liquid crystalline polymer in a liquid state and later cured.

Conventional extrusion apparatus can be used to extrude the thermotropic liquid crystalline polymers. Such apparatus are described in, for example, *Plastics Engineering Handbook of the Society of the Plastics Industry*, pp. 156–203, 4th edition, edited by Joel Frados, Van Nostrand Reinhold Company, 1976.

The conditions of temperature and pressure under which the thermotropic liquid crystalline polymer can be extruded are not critical and can easily be determined by one of ordinary skill in the art. Typically, extrusion temperature ranges from 0 to 30° C. above the melting point (which ranges from 200° C. to 350° C.) and the pressure ranges from 100 psi to 5,000 psi depending on the temperature and the viscosity of the polymer.

The thermotropic liquid crystalline polymers can be extruded to form a variety of shaped articles. Appropriate dies must be chosen for this purpose but can be determined easily by one of ordinary skill in the art.

In order to achieve high molecular orientation throughout the part, and thus high mechanical properties, the extrudate must be drawn down in the melt phase. The draw ratio, defined by the ratio of die cross-sectional area to extrudate cross-sectional area, should range between 4 and 100, preferably between 10 and 50. Appropriate cooling must be applied before take-up or haul-off in order to keep the integrity of the extrudate. For example, when the extrudate is small, blowing of air or other gases may be sufficient, but larger extrudates (for example, smallest dimension > 20 mils) require water cooling.

The extrudates as produced exhibit very high mechanical properties. On the other hand conventional polymers extruded with the above method have an order of magnitude lower properties. Even if these extrudates of conventional polymers are drawn in the solid state, the properties are much lower than those of thermotropic liquid crystalline polymers produced according to the above method Fabrication of the tube requires a tube die. Preferably, the tube is melt extruded while simultaneously passing the optical fiber therethrough. In order to provide melt drawdown only to the tube, the melt should not touch the optical fiber and the extrusion rate or take-off speed should be controlled to accomplish this. Specifically, the extrusion speed of the annular melt should be slower than the take-off speed by factor of the drawdown ratio, and the take-off speed of the tube and the optical fiber should be nearly the same.

An alternate method of fabricating the tube comprises passing a plurality of filaments of thermotropic liquid crystalline polymer through a heating die wherein the filaments are converged and fused together In cases where a space is provided between the fiber and tube, such space may be filled with any desired medium such as gas or a water-repellant agent for example, depending upon the intended use of the cable. Alternatively, the tube can be provided with a tight-fit whereby such space is not created. Such a tight-fit can be created, for example, by the afore-mentioned coating process.

Figure 6:
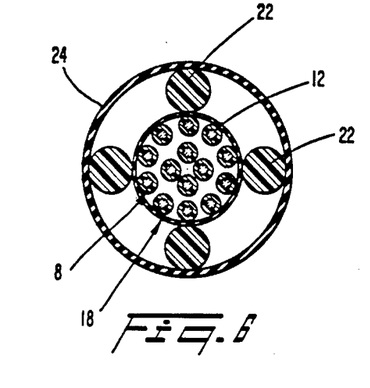
FIG. 6 is a cross-sectional view of another type of fiber-optic cable.

It will be appreciated that cables will be subject to differing types and magnitudes of forces, depending upon the manner of installing and operating the cable. For example, during aerial use, where the cable may be suspended from poles, greater tensile forces may be encountered from wind, ice, etc. Depending upon the particular use to which the cable is subjected, then, it may be desirable to provide the cable with a different type of reinforcement, comprising helically wound elongated members 22 of circular cross-section which encompasses the jacket 18 (FIG. 6). In this case the tubes 8 may be formed of conventional thermoplastic materials, or may also be formed of thermotropic liquid crystalline polymers. An outer jacket 24 can be positioned around the elongated member 22 and the optic fiber bundle. The elongated members 22 are formed of thermotropic liquid crystalline polymer, and would preferably be extruded in a manner similarly to that described earlier with regard to tubes, except that a rod die must be used instead of a tube die.

Figure 7:
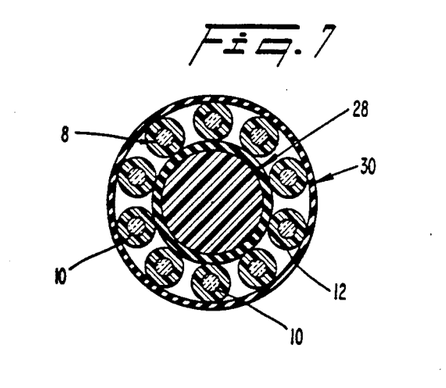
FIG. 7 is a cross-sectional view through still another type of fiber-optic cable.

Another type of additional reinforcement is depicted in FIG. 7 wherein a large thermotropic liquid crystalline polymer elongated member 28 is positioned centrally of the cable and is surrounded by a plurality of tube-encased fiber units 8. A jacket 30 surrounds the units 8. This jacket may comprise a wrap of thermotropic liquid crystalline tape if additional control of cable thermal expansion is desired. Such a tape wrap may contribute significantly to the tensile stiffness of the final cable.

In this regard, it will be appreciated that it is possible, in accordance with the present invention, to employ extruded thermotropic liquid crystalline polymer in the form of an elongated member as a replacement for the reinforcement presently employed in fiber-optic cable, regardless of whether tubes of thermotropic liquid crystalline polymer are employed. Thus, in accordance with the present invention, a fiber-optic cable having reinforcing elongated members, e.g., elongated members of circular cross-section which are helically wrapped or positioned linearly, can be improved by forming those elongated members of a thermotropic liquid crystalline polymer material (preferably formed by extrusion).

Such an extrusion process would be similar to that discussed above with reference to the filament 22.

A single elongated member of thermotropic liquid crystalline polymer of 25 mils diameter possesses a tensile modulus of $4-10\times10^6$ psi A strand of Kevlar poly(p-phenylene terephthalamide) of 26 mils diameter (which strand is formed of poly(p-phenylene terephthalamide) fibers adhered together by adhesive) possesses a tensile modulus of $11\times10^6$ psi. However, the elongated member of thermotropic liquid crystalline is highly superior. That is, since poly(p-phenylene terephthalamide) is lyotropic, it is not melt extrudable, and thus cannot be extruded in the form of large or complex cross-sections as can a thermotropic liquid crystalline polymer in accordance with the present invention.

Another advantage of employing elongated members of thermotropic liquid crystalline polymer material occurs in cases where glass optial fibers are employed, since the coefficient of linear thermal expansion of thermotropic liquid crystalline polymer is negative, and controllable, so that a fiber-optic cable utilizing such members can be made to have a linear thermal expansion coefficient very similar to that of glass optical fibers, as discussed earlier.

It may be desirable, then, to support an optical cable with a melt extruded elongated member of substantially uniform cross-sectional configuration, the elongated member being composed of a thermotropic liquid crystalline polymer having a tensile modulus of approximately 4,000,000 to 20,000,000 psi, and a tensile strength of at least 40,000 psi. The cross-sectional area of the elongated member is preferably at least $7.85\times10^{-5}$ square inch wherein no substantial portion of the cross-section measures less than approximately 0.01 inch or more than approximately 0.2 inch. The elongated member possesses a length of at least one mile, and an aspect ratio of at least 316,800 computed on the basis of the minimum cross-section measurement.

Figure 8:
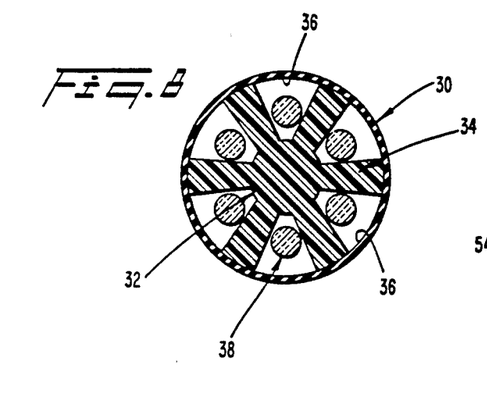
FIG. 8 is a cross-sectional view through a fiber-optic cable employing a channel member.

The melt-extrudable characteristic of thermotropic liquid crystalline polymer material is particularly beneficial in the formation of a channel-defining element 30, as depicted in FIG. 8. Such an element 30 comprises a central hub 32 and a plurality of radial ribs 34. Outwardly open channels 36 are formed between circumferentially adjacent ribs 34. Optical fibers 38 are positioned within respective ones of the channels.

Channel elements of such configuration have heretofore been proposed for use in fiber-optic cable, primarily because (i) the individual fibers are precisely located by the channels, (ii) a void within the cable can be more readily filled with a water-repelling agent or the like, as compared with the arrangement of a tube-encased fiber as depicted in FIG. 1, (iii) microbending losses at long wave lengths are reduced, and (iv) mass-splicing techniques can be used whereby an entire grooved rod with all fibers is spliced in one operation rather than having to break-out individual fibers for splicing.

In accordance with the present invention, such a channel-defining element is formed of thermotropic liquid crystalline polymer material. Accordingly, the channel element itself constitutes a strength member due to the high tensile properties of thermotropic liquid crystalline polymer material. Thus, the need for additional reinforcement can be eliminated or significantly minimized. Also, the negativity and magnitude of the coefficient of linear thermal expansion of the thermotropic liquid crystalline polymer material relative to that of glass is of great significance as explained earlier.

A further advantage relates to the simplicity r,f fabrication, since a strength member of thermotropic liquid crystalline polymer material can be easily extruded.

An alternate method of forming such a channel member is to machine channels into rods of thermotropic liquid crystalline polymer formed by methods described above. A simple method of performing such a machining operation would be to pass the rod through a tool or die consisting of a multiplicity of circularly disposed cutting teeth, which would continuously cut channels corresponding to the shape of the teeth.

Figure 9:
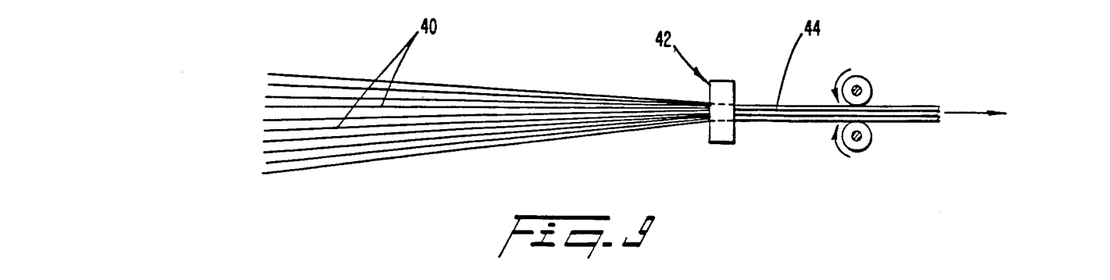
FIG. 9 is a schematic view of one technique for producing a channel member.

By comparison, the direct melt extrusion of such a channel member of a strength material such as poly(p-phenylene terephthalamide), for example, would not be possible. Such a configuration could be extruded from poly(p-phenylene terephthalamide) by passing preformed filaments of poly(p-phenylene terephthalamide) through a hot sizing die, but only if an adhesive substance is added to bond the individual poly(p-phenylene terephthalamide) filaments togehter. The use of an adhesive is not required, however, if filaments of thermotropic liquid crystalline polymer are employed, since the thermotropic liquid crystalline polymer filaments are capable of being fused together in the die. Such an extrusion process is depicted in FIG. 9, wherein a plurality of filaments 40 of thermotropic liquid crystalline polymer are passed through a hot sizing die 42 and, in so doing, are fused together in the form of a unitary channel member 44.

Figure 10:
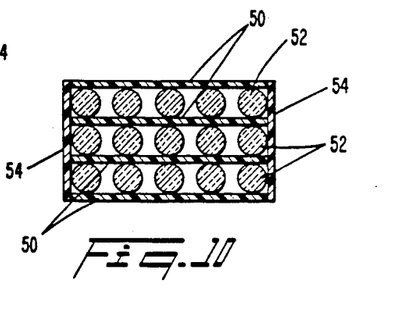
FIG. 10 is a cross-sectional view of a fiber-optic cable formed of rows of optical fibers separated by layers of thermotropic liquid crystalline polymer and surrounded by a jacket of that material

As noted earlier, the thermotropic liquid crystalline polymer is highly suited for use as a wrap 18 for the fiber-optic cable, especially due to the relatively large negative value of the coefficient of thermal expansion. Such an expedient may also take the form of a ribbon array, as depicted in FIG. 10. A series of tapes 50 are passed through a die simultaneously with spaced rows 52 of optical fibers. The fibers adhere to layers of ethylene vinyl acetate adhesive on the tapes 50. Side tapes 54 enclose the sides of the ribbon, with the optical fibers sandwiched between the layers 50 of thermotropic liquid crystalline polymer. This type of cable can be employed as is, or can be helically twisted and surrounded by reinforcement.

It will be appreciated that the present invention enables fiber-optic cables of less size, bulk, and weight to be produced, without sacrificing stiffness and the ability to avoid straining of the optic fiber. The high tensile modulus and ease of fabrication of a thermotropic liquid crystalline polymer material as compared to a lyotropic liquid crystalline polymer, such as poly(p-phenylene terephthalamide), enables a cable component formed of a thermotropic liquid crystalline polymer to perform multiple functions, e.g., to act as a strength member as well as a sheathing member. Thus, the quantity of elements which must be incorporated within the cable can be reduced.

Since a thermotropic liquid crystalline polymer material is dielectric, it can be employed in fiber-optic cable in cases where metallic reinforcement is unacceptable due to its electrical conductivity.

The high negativity of the coefficient of linear thermal expansion of thermotropic liquid crystalline polymer material and the ability to control the value of such a coefficient, renders the use of a thermotropic liquid crystalline polymer highly beneficial in fiber-optic cable containing fibers of glass, since the temperature range in which such cable can be effectively employed is significantly increased.

The ability of thermotropic liquid crystalline polymer material to be melt extruded enables members of relatively large and complex cross-section to be formed of a strength material. Previously, such members were in some instances formed of non-strength materials such as polyethylene terephthalate. Fabrication thereof from strength materials has required the gluing together of individual elongated members, a relatively expensive procedure. Thus, channel members of thermotropic liquid crystalline polymer material may be extruded by direct melt extrusion or by fusing together a plurality of elongated members of thermotropic liquid crystalline polymer material without the need for an adhesive.

Reinforcing members formed of thermotropic liquid crystalline polymer material can be thinned to the point where the permissible elongation reaches fairly low levels, e.g., 1-3%, and closely resembles that of glass. This assures that the glass and the reinforcement will both break when elongated by similar amounts, thereby avoiding the situation where some optical fibers break, but not the reinforcement. That is, it is considered preferable that the fiber-optic cable either function at full capacity or not at all. This is achieved by having the glass fibers and the reinforcement break at about the same time.

Although the invention has been described in connection with preferred embodiments thereof, it will be appreciated by those skilled in the art, that additions, modifications, substitutions, and deletions not specifically described, may be made without departing from the spirit and scope of the invention as defined in the appended claims.

We claim:

1. A reinforced fiber-optic cable comprising at least one optical fiber, and at least one strength member comprising a hollow tube formed-in-place around said at least one optical fiber, said tube formed of a thermotropic liquid crystalline polymer which resists deformation and breakage of said at least one optical fiber.

2. A reinforced fiber-optic cable according to claim 1, wherein said at least one optical fiber comprises a single fiber, and said at least one strength member comprises a single said tube.

3. A reinforced fiber-optic cable according to claim 1, wherein said at least one optical fiber comprises a plurality of fibers, said at least one strength member comprises a plurality of said tubes individually surrounding said fibers, and a jacket surrounds all of said tubes.

4. A reinforced fiber-optic cable according to claim 3, wherein said jacket is formed of thermotropic liquid crystalline polymer.

5. A reinforced fiber-optic cable according to claim 1, wherein said at least one fiber is formed of glass, said thermotropic liquid crystalline polymer having a coefficient of linear thermal expansion which is from $-10 \times 10^{-6}/°F.$ to $-4 \times 10^{-6}/°F.$ 6. A reinforced fiber-optic cable according to claim 1, wherein there is a space between said optical fiber and an inner periphery of said tube.

7. A reinforced optic-fiber cable comprising:
a strength member in the form of a channel member which includes a core and a plurality of longitudinal channels, said channel member formed of a thermotropic liquid crystalline polymer which resists deformation of said cable, and
a plurality of optical fibers disposed in respective ones of said channels.

8. A reinforced optic-fiber cable according to claim 7, wherein said channel member includes a plurality of ribs projecting radially from said core to define said channels.

9. A reinforced optic fiber-cable according to claim 7, wherein said fibers are formed of glass and said thermotropic liquid crystalline polymer has a coefficient of linear thermal expansion which is from $-10 \times 10^{-6}/°F.$ to $-4 \times 10^{-6}/°F.$ 10. A reinforced fiber-optic cable according to claim 7, wherein said channels are outwardly open, and a jacket surrounds said channel member and encloses said channels.

11. A reinforced optic fiber cable according to claim 10, wherein said jacket is formed of thermotropic liquid crystalline polymer.

12. A reinforced fiber-optic cable comprising at least one optical fiber and at least one strength member comprising an elongated member of thermotropic liquid crystalline polymer extending generally in the direction of said fiber, and jacket means enclosing said fiber and said elongated member.

13. A reinforced fiber-optic cable according to claim 12, wherein said elongated member is helically wound around said fiber.

14. A reinforced fiber-optic cable according to claim 12, wherein said elongated member extends parallel to said fiber.

15. A reinforced fiber-optic cable according to claim 14, wherein there are a plurality of said fibers, said elongated member extending centrally of said fibers.

16. A reinforced fiber-optic cable according to claim 12, wherein there are a plurality of said optical fibers.

17. A reinforced fiber-optic cable according to claim 12, wherein said optical fiber is formed of glass, said thermotropic liquid crystalline polymer having a coefficient of linear thermal expansion from $-10 \times 10^{-6}/°F.$ to $-4 \times 10^{-6}/°F.$ 18. A reinforced fiber-optic cable according to claim 12, wherein said jacket is formed of thermotropic liquid crystalline polymer.

19. A reinforced fiber-optic cable comprising a plurality of optical fibers, a strength member extending along said fibers, and an outer jacket formed of thermotropic liquid crystalline polymer and surrounding said fibers and strength member.

20. A reinforced fiber-optic cable according to claim 19, wherein said optical fibers are arranged in spaced rows, and a layer of thermotropic liquid crystalline polymer separating adjacent rows.

21. A method of making a reinforced fiber-optic cable comprising the steps of forming a strength member by forming thermotropic liquid crystalline polymer in the shape of a hollow tube in surrounding relationship to an optical fiber such that deformation of said fiber is resisted by said tube.

22. A method according to claim 21, wherein said positioning step includes positioning an optical fiber formed of glass in said tube, with said thermotropic liquid crystalline polymer having a coefficient of linear thermal expansion of from $-10 \times 10^{-6}/°F$. to $-4 \times 10^{-6}/°F$.

23. A method according to claim 21, wherein said tube is extruded by passing a plurality of filaments of thermotropic liquid crystalline polymer through a heating die and fusing said filaments together.

24. A method according to claim 21, wherein said tube is formed by coating said fiber with a thermotropic liquid crystalline polymer.

25. A method according to claim 21, wherein said forming step comprises forming a plurality of said tubes, and said positioning step comprises positioning an optical fiber within each said tube, and further comprising the step of surrounding all of said tubes within a jacket.

26. A method according to claim 25, wherein said jacket is formed of a thermotropic liquid crystalline polymer.

27. A method according to claim 21, wherein said tube is formed by melt extrusion.

28. A method of making a reinforced fiber-optic cable comprising the steps of:
   forming a strength member by extruding a thermotropic liquid crystalline polymer in the shape of a channel member having a core and a plurality of longitudinal channels, and
   positioning optical fibers within respective ones of said channels, with deformation and breakage of said fibers being resisted by said strength member.

29. A method according to claim 28, wherein said channel member is formed with a plurality of ribs projecting radially from said core, said ribs being circumferentially spaced to define said channels, and a jacket is formed around said channel member to enclose said channels.

30. A method according to claim 28, wherein said jacket is formed of thermotropic liquid crystalline polymer.

31. A method according to claim 28, wherein said optic fibers are formed of glass and said thermotropic liquid crystalline polymer has a coefficient of linear thermal expansion from $-10 \times 10^{-6}/°F$. to $-4 \times 10^{-6}/°F$.

32. A method according to claim 28, wherein said channel member is extruded by passing a plurality of filaments of thermotropic liquid crystalline polymer through a heating die and fusing said filaments together.

33. A method according to claim 28, wherein said channel member is formed by melt extrusion.

34. A method of making a reinforced fiber-optic cable comprising the steps of:
   forming a strength member by extruding a thermotropic liquid crystalline polymer in the shape of an elongated member,
   positioning said elongated member adjacent an optical fiber and extending generally in the longitudinal direction thereof, and
   surrounding said optical fiber and elongated member by means of a jacket.

35. A method according to claim 34, wherein said positioning step includes winding said elongated member helically around said optical fiber.

36. A method according to claim 34, wherein said positioning step comprises positioning said elongated member parallel to said optical fiber.

37. A method according to claim 34, wherein said elongated member is formed by melt extrusion.

38. A method according to claim 34, further comprising the step of surrounding said elongated member and optical fiber by a jacket formed of thermotropic liquid crystalline polymer.

39. A method of making a reinforced fiber-optic comprising the step of surrounding a plurality of optical fibers and a strength member with a jacket formed of thermotropic liquid crystalline polymer.

40. A method according to claim 39 including the steps of arranging said optical fibers in spaced rows, and positioning a layer of thermotropic liquid crystalline polymer between adjacent rows.

41. A method according to claim 39, wherein said optical fibers are formed of glass, said thermotropic liquid crystalline polymer having a coefficient of linear thermal expansion from $-10 \times 10^{-6}/°F$. to $-4 \times 10^{-6}/°F$.

42. An improved optial fiber cable construction, comprising
   (A) an optical fiber for conduction of light energy signals;
   (B) a coating of thermoplastic material around the surface of said optical fiber;
   (C) a jacket of thermotropic liquid crystalline polymer positioned around the coating of thermoplastic material; and
   (D) said thermotropic liquid crystalline polymer being of the type which is melt processable and which exhibits optical anisotrophy in the melt.

43. The cable according to claim 42 wherein said thermotropic liquid crystalline polymer is a copolymer of polyehylene terephtalate and p-hydroxybenzoic acid.

44. The cable according to claim 43 wherein said p-hydroxybenzoic acid is 60 mole %.

45. The cable according to claim 42 wherein said thermotropic liquid crystalline polymer is 2,6-naphthalenedicarboxylic acid, hydroquinone, and p-hydroxybenzoic acid.

46. The cable according to claim 42 which included:
   (A) a plurality of optical fibers, each including said coating of thermoplastic material; and
   (B) said jacket of thermoplastic liquid crystalline polymer surrounding said plurality of optical fibers.

47. A method of making an optical fiber cable comprising the steps of:
   (A) providing a coated optical fiber to the die member of an extruding machine; and
   (B) providing a liquified thermotropic liquid crystalline polymer to said die member to surround said coated optical fiber therewith.

48. A method in accordance with claim 47 wherein:
   (A) said extruding machine includes a heated feed section; and
   (B) said thermotropic liquid crystalline polymer is provided to said feed section in solid form.

* * * * *

UNITED STATES PATENT AND TRADEMARK OFFICE
CERTIFICATE OF CORRECTION

PATENT NO. : 4,772,089

DATED : September 20, 1988

INVENTOR(S) : Yoshiaki Ide, Gabor Kiss and Hyun N. Yoon

It is certified that error appears in the above-identified patent and that said Letters Patent is hereby corrected as shown below:

On the title page

Delete the information following [73] and insert:

-- Hoechst Celanese Corporation,
Somerville, N.J. --.

Signed and Sealed this

Twenty-eighth Day of March, 1989

Attest:

DONALD J. QUIGG

*Attesting Officer*    *Commissioner of Patents and Trademarks*